US012797793B2

United States Patent
(12) United States Patent
Carrasco Maldonado et al.

(10) Patent No.: US 12,797,793 B2
(45) Date of Patent: Nov. 17, 2026

(54) REMOVING HEAVY METALS FROM OFF-GAS FOR CARBON CAPTURE

(71) Applicant: HSustainability GmbH, Heidelberg (DE)

(72) Inventors: Francisco Carrasco Maldonado, Heidelberg (DE); Maciej Zajac, Heidelberg (DE); Nicolas Pato, Heidelberg (DE)

(73) Assignee: HSustainability GmbH, Heidelberg (DE)

(*) Notice: Subject to any disclaimer, the term of this patent is extended or adjusted under 35 U.S.C. 154(b) by 320 days.

(21) Appl. No.: 18/833,508

(22) PCT Filed: Mar. 9, 2023

(86) PCT No.: PCT/EP2023/056008
§ 371 (c)(1),
(2) Date: Jul. 26, 2024

(87) PCT Pub. No.: WO2023/170203
PCT Pub. Date: Sep. 14, 2023

(65) Prior Publication Data

US 2025/0144565 A1 May 8, 2025

(30) Foreign Application Priority Data

Mar. 10, 2022 (EP) ..................................... 22161403

(51) Int. Cl.

| | |
|---|---|
| ***B01D 53/00*** | (2006.01) |
| ***B01D 53/62*** | (2006.01) |
| ***B01D 53/64*** | (2006.01) |
| ***B01D 53/75*** | (2006.01) |
| ***B01D 53/80*** | (2006.01) |
| ***C04B 18/167*** | (2023.01) |
| ***C04B 20/02*** | (2006.01) |
| ***C04B 28/02*** | (2006.01) |
| ***C04B 40/02*** | (2006.01) |
| *C04B 103/00* | (2006.01) |
| *C04B 111/00* | (2006.01) |

(52) U.S. Cl.

CPC ........... *B01D 53/80* (2013.01); *B01D 53/002* (2013.01); *B01D 53/62* (2013.01); *B01D 53/64* (2013.01); *B01D 53/75* (2013.01); *C04B 18/167* (2013.01); *C04B 20/023* (2013.01); *C04B 28/02* (2013.01); *C04B 40/0231* (2013.01); *B01D 2251/404* (2013.01); *B01D 2251/602* (2013.01); *B01D 2257/504* (2013.01); *B01D 2257/602* (2013.01); *C04B 2103/0078* (2013.01); *C04B 2111/00017* (2013.01)

(58) Field of Classification Search

None
See application file for complete search history.

(56) References Cited

U.S. PATENT DOCUMENTS

2016/0363368 A1 12/2016 Zanganeh et al.

FOREIGN PATENT DOCUMENTS

| | | | |
|---|---|---|---|
| EP | 3 744 700 | A1 | 12/2020 |
| EP | 3 750 619 | A1 | 12/2020 |
| EP | 3 808 713 | A1 | 4/2021 |
| EP | 4 059 905 | A1 | 9/2022 |
| EP | 4 124 609 | A1 | 2/2023 |
| EP | 4 155 278 | A1 | 3/2023 |
| KR | 10-2014-0107808 | A | 9/2014 |
| RU | 2441699 | C2 | 2/2012 |
| WO | 2011/049275 | A1 | 4/2011 |
| WO | 2019/115722 | A1 | 6/2019 |

OTHER PUBLICATIONS

PCT—International Preliminary Report on Patentability of Application No. PCT/EP2023/056008, Dated Sep. 10, 2024.
International Search Report in PCT/EP2023/056008, mailed Jun. 2, 2023.
European Search Report dated Sep. 7, 2022 in European Application No. 22161403.5.
K. You et al., "Effect of CO2 Carbonation on the Chemical Properties of Waste Cement: CEC and the Heavy Metal Adsorption Ability", Materials Transactions, vol. 52, No. 8 (2011), pp. 1679 to 1684, total of 6 pages.
Y. Zheng et al., "Review of technologies for mercury removal from flue gas from cement production processes", Progress in Energy and Combustion Science 38 (2012) 599-629, total of 31 pages.
S.K. Kaliyavaradhan et al., "Valorization of waste powders from cement-concrete life cycle: A pathway to circular future", Journal of Cleaner Production 268 (2020) 122358, total of 25 pages.

(Continued)

*Primary Examiner* — Stefanie J Cohen

(74) *Attorney, Agent, or Firm* — Collard & Roe, P.C.

(57) ABSTRACT

Carbon capture method for an industrial plant off-gas involves removing mercury and/or other heavy metals from the off-gas by contacting the off-gas with an at least partially hydrated cement paste as sorbent in a scrubber before a concentration step of the off-gas to concentrate $CO_2$. The at least partially hydrated cement paste is simultaneously carbonated and loaded with the mercury and/or other heavy metals during contacting with the off-gas and is used as supplementary cementitious material in composite cement. The at least partially hydrated cement paste is used as sorbent in a scrubber before a concentration step of the off-gas to concentrate $CO_2$.

20 Claims, No Drawings

(56) References Cited

OTHER PUBLICATIONS

N.J. Coleman et al., "Interactions of aqueous Cu2+, Zn2+ and Pb2+ ions with crushed concrete fines", Journal of Hazardous Materials B121 (2005) 203-213, total of 11 pages.

B. Savija and M. Luković, "Carbonation of cement paste: Understanding, challenges, and opportunities", Construction and Building Materials 117 (2016) 285-301, total of 17 pages.

REMOVING HEAVY METALS FROM OFF-GAS FOR CARBON CAPTURE

CROSS REFERENCE TO RELATED APPLICATIONS

This application is the National Stage of PCT/EP2023/056008 filed on Mar. 9, 2023, which claims priority under 35 U.S.C. § 119 of European Application No. 22161403.5 filed on Mar. 10, 2022, the disclosure of which is incorporated by reference. The international application under PCT article 21(2) was published in English.

The present invention relates to a method and use for removing heavy metals from off-gases comprising $CO_2$ to improve the carbon capture process.

Industrial combustion processes and other steps like the decarbonation of limestone result in off-gases comprising carbon dioxide. The industry is engaged in reducing the carbon footprint of their processes to comply with $CO_2$ reduction targets as stated in the Paris Agreement. The implementation of carbon capture technologies is an effective tool to comply with those targets. In the final step of a carbon capture process, the sequestered $CO_2$ undergoes purification steps to observe the requirements determined by the storage site or end-user, respectively. Mercury and other heavy metals, which are off-gas impurities originating from fuels and/or raw material used, have the potential of interacting unfavourably with capture, compression, and pipeline transmission of $CO_2$. Mercury causes metal embrittlement. Also, specifically brazed aluminium heat exchangers used in $CO_2$ processing units are affected adversely by a corrosive attack of mercury. Therefore, heavy metals and especially mercury have to be limited in the captured $CO_2$ to ensure further steps are not adversely affected by them.

Typical methods to capture mercury and other heavy metals from off-gas include the use of solid sorbents, especially activated carbon, but also biochars, zeolites and chemical-impregnated sorbents. Activated carbon is a carbonaceous material processed to have small, low-volume pores that substantially increase the surface area. Mercury and other impurities are adsorbed into the specific surface area and the structure of micropores, contributing to their removal from the gas stream. Other sorbents rely on high surface areas, too, and/or on a chemical reaction binding the impurities to the solid. The disposal of mercury-loaded activated carbon and other sorbents poses a problem since the loaded material is very difficult to reuse and usually has to be landfilled. Thus, there is still a need to find improved ways for removing heavy metals, especially mercury, from industrial plant off-gas comprising $CO_2$ which shall be removed from the off-gas by carbon capture.

It was now surprisingly found that during the enforced carbonation of fines from cement and concrete recycling with cement plant off-gas in a semi-dry scrubber the partially hydrated hydraulic cement paste captures heavy metals, especially mercury, resulting in a loaded sorbent which can be utilized as supplementary cementitious material in composite cements.

The above problem is therefore solved by a carbon capture method for off-gas wherein mercury and/or other heavy metals are removed from the off-gas comprising $CO_2$ by contacting the off-gas with an at least partially hydrated cement paste as sorbent in a scrubber before a concentration step of the off-gas to concentrate $CO_2$, wherein the at least partially hydrated cement paste is simultaneously carbonated and loaded with the mercury and/or other heavy metals during contacting with the off-gas and is used as supplementary cementitious material in composite cement. The object is further achieved by using an at least partially hydrated cement paste as sorbent for removing mercury and/or other heavy metals from off-gas comprising $CO_2$ by contacting the off-gas with the sorbent thereby simultaneously carbonating the sorbent and loading the sorbent with the mercury and/or other heavy metals, subjecting a cleaned off-gas obtained to carbon capture, and disposing the carbonated and loaded sorbent as supplementary cementitious material in composite cement.

The method and use according to the invention are suitable for removing heavy metals from the off-gas of all industrial plants where carbon dioxide is emitted, for example, but not exclusively from the off-gas of cement plants and lime kilns, from the off-gas of coal, oil and gas fired power plants as well as from the off-gas of waste incineration plants. The method and use are especially suitable for treating the off-gas from cement plants.

Besides or alternatively to the removal of mercury (Hg), in particular but not limited to, the other heavy metals lead (Pb), chromium (Cr), copper (Cu), manganese (Mn), molybdenum (Mo), and titanium (Ti) are removed from the gas.

The at least partially hydrated cement paste used as sorbent can be freshly produced for the method and use according to the invention. Preferably, the source of the cement is a waste material or by-product.

In one embodiment aged cement not suitable for making concrete and other known uses of cement anymore is crushed and mixed with water to obtain the partially hydrated cement paste. Aged means the cement has been stored too long so that the hydraulic phases have been partially (e.g. ≥5 wt.-% of them) hydrated and/or carbonated, causing a too great loss of the potential strength. Preferably, recycled cement paste (abbreviated RCP herein) obtained from a recycling process of cement containing waste material is used as sorbent. Suitable waste materials are for example, but not exclusively, suspensions from cleaning concreting equipment and filter cakes therefrom, discarded concrete and mortar, and the fine fractions from concrete demolition. RCP is obtained from such waste materials as known per se. Suspensions can be used as such and also be filtered, concentrated or diluted, depending on the desired solid content of the sorbent. Discarded concrete and mortar usually need to be crushed and/or ground to obtain a fine enough sorbent, typically aggregate is separated from the RCP by sieving. The crushed and/or ground and/or sieved product can then be mixed with water or fed to the scrubber as dry material with water and/or an aqueous suspension of RCP being added concurrently. Concrete demolition waste is typically crushed and ground and the fines are obtained by sieving or any other means of sorting by size or gravity. To enhance separation of aggregate and hardened paste the grinding can take place in a carbon dioxide enriched atmosphere. Here too, the fines can be mixed with water or added as dry material with concurrent water addition and/or addition of an RCP suspension into the scrubber.

The sorbent for contacting with the off-gas can also be a mixture of different kinds of at least partially hydrated cement paste, e.g. of two or three or more of the materials described above. A mixture can be made of the ready for use sorbents, at earlier stages like during crushing or grinding of the materials used to provide the sorbents, and also in both ways. For example, demolished concrete and discarded mortar can be crushed and ground together, sieved to separate RCP from aggregate, and afterwards mixed with washing water obtained during cleaning of concreting devices.

The original cement of the at least partially hydrated cement paste can be based on Portland type cement, belite cement, belite sulfoaluminate cement, calcium aluminate cement, or geopolymer type binder e.g. based on slag or slag mixtures.

The hydration degree of the cement in the paste should range from 50 to 100%, preferably from 70 to 100%, most preferred from 75 to 100%, of the hydratable phases in the contained cement.

With regard to sorbent capacity a pure at least partially hydrated cement paste is preferred as sorbent. However, in practice the material used as a sorbent mostly contains further substances, especially fine aggregate. Preferably, substances apart from the at least partially hydrated cement paste are contained in amounts of up to 60 wt.-%, preferably up to 40 wt.-%, and most preferred up to 30 wt.-%, calculated as solids with respect to the total solids.

Solid sorbents should have a suitable particle size distribution (abbreviated PSD herein) to provide a big enough contact surface. Usually, a PSD with a $d_{50}\leq 250$ μm, preferably a $d_{50}\leq 150$ μm, and most preferred a $d_{50}\leq 100$ μm are well suited. Preferably, the $d_{10}$ ranges from 5 to 50 μm, most preferred from 1 to 10 μm and/or the $d_{90}$ from 100 to 200 μm, most preferred from 60 to 150 μm. The PSD is measured with a conventional particle size analyzer.

The off-gas is usually taken as arising, for example in the industrial plant or waste incineration, for feeding to a known scrubbing step. It is also possible to adapt a plant so that a scrubbing is added or provided at another point in the process. Typically, off-gases have a $CO_2$ content from 10 to 35 Vol.-%, often from 10 to 15 Vol.-%, most often from 10 to 13 Vol.-%. The method and use are also suitable for off-gases with higher, even much higher $CO_2$ content. For example, in a typical standard cement plant off-gas with a $CO_2$ content from 25 to 35 Vol.-% is fed to a scrubbing for absorption of acid components. But in a recent development using oxygen as combustion gas, so-called oxyfuel process, the off-gas contains much higher $CO_2$ content from 70 to 95 Vol.-%. The invention benefits both.

Suitable scrubbers for contacting the sorbent with the off-gas are known. Preferred are semi-dry scrubbers, but wet scrubbers can also be used. Typically, the scrubber is arranged to clean the off-gas from particulates and/or gases before the stack. Design and operation of the scrubber are as usual, except that at least partially hydrated cement paste is used as the sorbent. Cleaned off-gas usually passes a dust removal where the spent sorbent is collected, and is then passed into the carbon capture. Suitable conditions for the contacting are described in the following.

The water concentration during contacting of the sorbent with the plant off-gas can be provided either by water spraying increasing the relative humidity to at least 70 Vol.-%, preferably to 100 Vol.-%, or by producing a slurry containing the sorbent in a solid concentration ranging from 100 g/l to 250 g/l.

The temperature during contacting the at least partially hydrated cement paste with the plant off-gas usually ranges from 50 to 100° C., preferably from 60 to 85° C., most preferred from 65 to 80° C.

The contact time is determined by the size of the scrubber, the kind and PSD of the sorbent, and the flow rate of the exhaust gas. Normally, those parameters are adapted to obtain the desired removal of heavy metals and carbonation of the sorbent. Usually contact times of ≥5 minutes, preferably ≥15 minutes and preferably up to 120 minutes are suitable. It was found that during such times at least 20 wt.-%, preferably at least 30 wt.-%, and most preferred at least 40 wt.-% of the heavy metals contained are removed from the exhaust gas. Typically, up to 90 wt.-%, often up to 95 wt.-% and even up to 100 wt.-% of the heavy metals are removed during such times. A suitable carbonation degree of the sorbent ranges from 70 to 100% of the carbonatable phases in the sorbent.

In case it is desired to increase the carbonation degree of the spent sorbent, especially when it is below e.g. 50%, any known method and device for carbonation can be used. One very efficient way is described in EP 3 744 700 A1. Other possible methods and devices are found in EP 3 808 713 A1, not yet published EP21163464.7 (=EP 4 059 905 A1), EP21198297.0 (=EP 4 155 278 A1), and EP21188485.3 (=EP 4 124 609 A1) as well as the prior art mentioned therein.

Off-gas, especially industrial plant off-gas, and sorbent are fed to the scrubber and cleaned off-gas and spent sorbent withdrawn as known per se.

The sorbent is simultaneously carbonated and loaded with heavy metals during contacting it with the plant off-gas. Thus, the spent sorbent is a carbonated hydrated cement paste, which is known to be a useful supplementary cementitious material in composite cements. In an industrial scale scrubber, large amounts of the sorbent are present, normally in the range of tenths of ton/h. The amounts of heavy metals to be captured are normally in the scale of g/h. Due to this low amount of heavy metals in the final carbonated and loaded paste it is expected that the spent sorbent can be employed in the formulation of composite cements without further treatment. Such composite cements are also low-carbon cements, since replacing cement clinker with supplementary cementitious material reduces the carbon dioxide emission due to calcium carbonate calcination and from fuel burning.

The cleaned off-gas is passed into a carbon capture process, where a gas with increased $CO_2$ concentration is obtained as known per se. In contrast to the multiple proposals of using waste concrete and similar materials for sequestering $CO_2$, the decrease of $CO_2$ in the scrubber is kept low according to the invention. In other words, while a high carbonation degree of the sorbent is beneficial and desired, a low sequestration of $CO_2$ is aimed at. Usually, the $CO_2$ content in the off-gas decreases by 1% or 3% or 5% or 10% with regard to the initial amount. Possibly, but not preferred, the decrease can amount to 20% or 30%, but not more. The remaining $CO_2$ concentration should be at least 8 Vol.-%, preferably at least 10 Vol.-%, most preferred at least 12 Vol.-%. Typical methods to capture $CO_2$ include chemical or physical absorption using solvents, physical absorption with absorbent beds using silica or zeolites, regeneration cycles e.g. pressure or temperature swing adsorption. Other methods are in development like $CO_2$ capture using membranes. Finally, a cryogenic step is usually applied to obtain a highly pure $CO_2$ stream ready for utilization or storage. The removal of heavy metals achieved according to the invention improves the purity of the captured $CO_2$ and avoids any adverse or detrimental effects on the materials used for absorption/adsorption and constituting the devices used for the capturing.

Thus, the method and use according to the invention provide an easy and low cost way for removing heavy metals, especially Hg, Pb, Cr, Cu, Mn, Mo, and Ti, in particular Hg, Pb, Cu, and Ti, from an off-gas, especially from a combustion plant off-gas, allowing an efficient carbon capture with subsequent utilization or storage of the captured carbon dioxide. The spent sorbent constitutes a valuable material avoiding any need for regeneration or landfilling thereof. The device, a semi-dry scrubber, is easily integrated into existing and newly built cement plants. Its operation is simple and the process very robust.

There have been prior proposals to use RCP for cleaning exhaust gas from carbon dioxide, also coupled with a use of carbonated RCP in composite cements and/or mentioning that $SO_x$ can be bound as well, see e.g. S. K. Kaliyavaradhan et al., "Valorization of waste powders from cement-concrete life cycle . . . ", J. of Cleaner Production 268 (2020) 122358, WO 2019/115722 A1 and EP 3 750 619 A1 as well as the prior art mentioned therein. However, it was not disclosed or possible to suspect from those documents that RCP would also be able to bind heavy metals and especially mercury. Thus, the usefulness of at least partially hydrated cement paste for heavy metal removal in carbon capture methods was very surprising. From S. K. Kaliyavaradhan et al. it is only known that the carbonated product can absorb heavy metals, which is attributed to the Ca-modified silica gel produced by carbonation by K. You et al., Materials Transactions 52 (2011), pp. 1670 to 1684 cited in S. K. Kaliyavaradhan et al. as source for heavy metal absorption capacity.

The invention will be illustrated further with reference to the example that follows, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

EXAMPLE

Filter cake from a pre-cast concrete elements plant was obtained as sorbent. This material arises after filtration of the process and cleaning water in the precast facility, and is characterized by a high concentration of hydrated cement paste, here mainly CEM III/A. The hydration time is limited to 2-6 weeks. The composition of the used RCP is shown in table 1.

TABLE 1

| Chemical composition (wt.-%) | |
|---|---|
| LOI (950° C.) | 22.44 |
| $SiO_2$ | 39.18 |
| $Al_2O_3$ | 6.88 |
| $Fe_2O_3$ | 1.76 |
| CaO | 43.51 |
| $SO_3$ | 3.04 |
| MgO | 3.90 |
| $K_2O$ | 0.41 |
| $Na_2O$ | 0.19 |

50 tons of this sorbent were collected, crushed and ground in an impact pin mill to a $d_{50}$ around 200 μm with 1-2 wt.-% residue above 1 mm. This sorbent was used instead of slaked lime as scrubbing media in the gas suspension absorber of a cement plant. The gas suspension absorber is normally used in conventional clinker production operation to scrub $SO_2$ from the off-gas of one of the two preheater strings. The semi-dry scrubber system was composed of the reactor itself, two cyclones with two recirculation boxes and a spraying nozzle system. The reactor was 3.65 m diameter and 14.2 m tall, featuring a gas retention time of ~2.2 s. It was composed of an inlet bend, a venturi with a velocity of 35 m/s and a riser section with a velocity of 6.4 m/s. Further, the fabric filter was used to collect the fine particles of spent sorbent leaving the cyclones. The sorbent was placed into the recirculation boxes and the system was modified to allow the recirculation of the sorbent captured in the bag filter to the riser section in order to maintain a constant hold-up in the system. The concentration of heavy metals measured with Advanced Mercury Analyzer and Inductively Coupled Plasma Mass Spectrometry in the fresh sorbent and in the spent sorbent collected in the bag filter and the recirculation containers, respectively, is listed in table 2.

TABLE 2

| Element | in sorbent [mg/kg] | in carbonated sorbent collected in the fabric filter [mg/kg] | in carbonated sorbent collected in the recirculation containers [mg/kg] |
|---|---|---|---|
| As | <5.00 | <2.68 | <4.76 |
| Ba | 258 | 242 | 284 |
| Be | 1.30 | 1.00 | 1.05 |
| Bi | <4.69 | <2.48 | <2.92 |
| Cd | 1.56 | <0.428 | 1.30 |
| Co | 15.07 | <0.431 | 15.30 |
| Cr | 38.72 | 58.02 | 46.15 |
| Cu | 93.20 | 179.75 | 139.00 |
| Ga | <2.64 | <1.18 | <2.03 |
| Hg | 0.0038 | 2.59 | 2.23 |
| Li | 17.67 | 12.07 | 16.6 |
| Mn | 685 | 1000 | 713.5 |
| Mo | <2.22 | 11.37 | 6.86 |
| Ni | 23.42 | 24.22 | 25.0 |
| Pb | <4.15 | 198.25 | 54.25 |
| Se | <2.43 | <5.00 | <3.94 |
| Sn | <5.00 | <3.83 | <5.00 |
| Sr | 411.5 | 366.5 | 380.0 |
| Te | <4.94 | <4.7 | <5.0 |
| Ti | <5.00 | 69.42 | 35.85 |
| V | 47.2 | 24.85 | 42.35 |
| Zn | 306 | 135 | 248.5 |

The substantial increase in concentration found for mercury and other heavy metals proves that those were loaded onto the sorbent. The mercury capture can be estimated based on the registered mercury emission from the typical emission value near 20 $\mu g/Nm^3$ (dry, 10% $O_2$) of the plant in past years (in indirect mode without raw mill and De-$SO_x$ scrubber operation). According to the values shown in table 2, the carbonated sorbent was loaded with an weighted average of 2.35 mg mercury per kg of sorbent (34% of carbonated RCP was recovered in the fabric filter), totalizing 28 g mercury (12 tons of sorbent were used in the trial). During the carbonation period (3.5 hours) <30 g mercury were transported in the exhaust gas considering historical values of gas measurements at the stack, and therefore it can be assumed that the sorbent provided full mercury removal.

The invention claimed is:

1. A carbon capture method for an off-gas comprising the steps of:

removing mercury and/or other heavy metals from the off-gas by contacting the off-gas with an at least partially hydrated cement paste as a sorbent in a scrubber; and subsequently concentrating the off-gas to concentrate $CO_2$ in a concentration step, wherein the at least partially hydrated cement paste is simultaneously carbonated and loaded with the mercury and/or other heavy metals during contacting with the off-gas and is used as supplementary cementitious material in composite cement.

2. The method according to claim 1, wherein the heavy metal is mercury, lead, chromium, copper, manganese, molybdenum, titanium or any mixture thereof.

3. The method according to claim 1, wherein the at least partially hydrated cement paste is obtained from waste or by-products by mixing aged cement with water and/or by retrieving recycled cement paste from a recycling process of cement containing waste.

4. The method according to claim 3, wherein the recycled cement paste is retrieved from suspensions resulting from cleaning concreting equipment, filter cakes thereof, discarded concrete or mortar, fine fractions from concrete demolition waste, and any mixture of two or more of them.

5. The method according to claim 1, wherein the hydration degree of the at least partially hydrated cement paste ranges from 50 to 100% of the hydratable phases in the contained cement paste.

6. The method according to claim 1, wherein the sorbent contains no more than 60 wt.-% substances other than partially hydrated cement paste, calculated as solids with respect to the total solids.

7. The method according to claim 1, wherein the sorbent has a particle size distribution with a $d_{50} \leq 250$ μm, and/or a $d_{10}$ from 1 to 50 μm, and/or a $d_{90}$ from 60 to 200 μm.

8. The method according to claim 1, wherein a relative humidity of ≥70 Vol.-% is provided during contacting the sorbent with the off-gas by spraying water into a device for contacting and/or by providing the sorbent in the form of a slurry with a solid concentration ranging from 100 to 250 g/l.

9. The method according to claim 1, wherein a temperature during contacting the sorbent with the off-gas is set to range from 50 to 100° C.

10. The method according to claim 1, wherein a contact time of contacting the sorbent with the off-gas is set to ≤5 minutes and/or until at least 20 wt.-% of the heavy metals are removed from the off-gas, and/or until a carbonation degree of the sorbent of 70 to 100% of the carbonatable phases in the sorbent is reached.

11. The method according to claim 1, wherein the $CO_2$ content in the off gas is reduced by not more than 30% with respect to the initial $CO_2$ content and/or the $CO_2$ content in the off-gas after the scrubber is at least 8 Vol.-%.

12. The method according to claim 1, wherein the concentration step comprises chemical or physical absorption of $CO_2$ in a solvent, physical absorption in an absorbent bed comprising silica or zeolites, a pressure or temperature swing absorption process, or extraction using a membrane.

13. The method according to claim 12, wherein the concentrated $CO_2$ is subjected to a series of compression steps and cooling using cryogenic treatment for further $CO_2$ purification.

14. The method according to claim 2, wherein the heavy metal is mercury, lead, copper, titanium, or any mixture thereof.

15. The method according to claim 14, wherein the heavy metal is mercury.

16. The method according to claim 5, wherein the hydration degree of the at least partially hydrated cement paste ranges from 75 to 100% of the hydratable phases in the contained cement paste.

17. The method according to claim 6, wherein the sorbent contains no more than 30 wt.-% substances other than partially hydrated cement paste.

18. The method according to claim 9, wherein the temperature during contacting the sorbent with the off-gas is set to range from 65 to 80° C.

19. The method according to claim 10, wherein the contact time of contacting the sorbent with the off-gas is set to from ≥15 minutes up to 120 minutes, and/or until at least 40 wt.-% of the heavy metals are removed from the off-gas.

20. The method according to claim 11, wherein the $CO_2$ content in the off-gas is reduced by not more than 20% with respect to the initial $CO_2$ content and/or the $CO_2$ content in the off-gas after the scrubber is at least 12 Vol.-%.

* * * * *